June 9, 1931.  P. WAGNER ET AL  1,809,653
AUTOMATIC ARC WELDING MACHINE
Filed Dec. 7, 1928
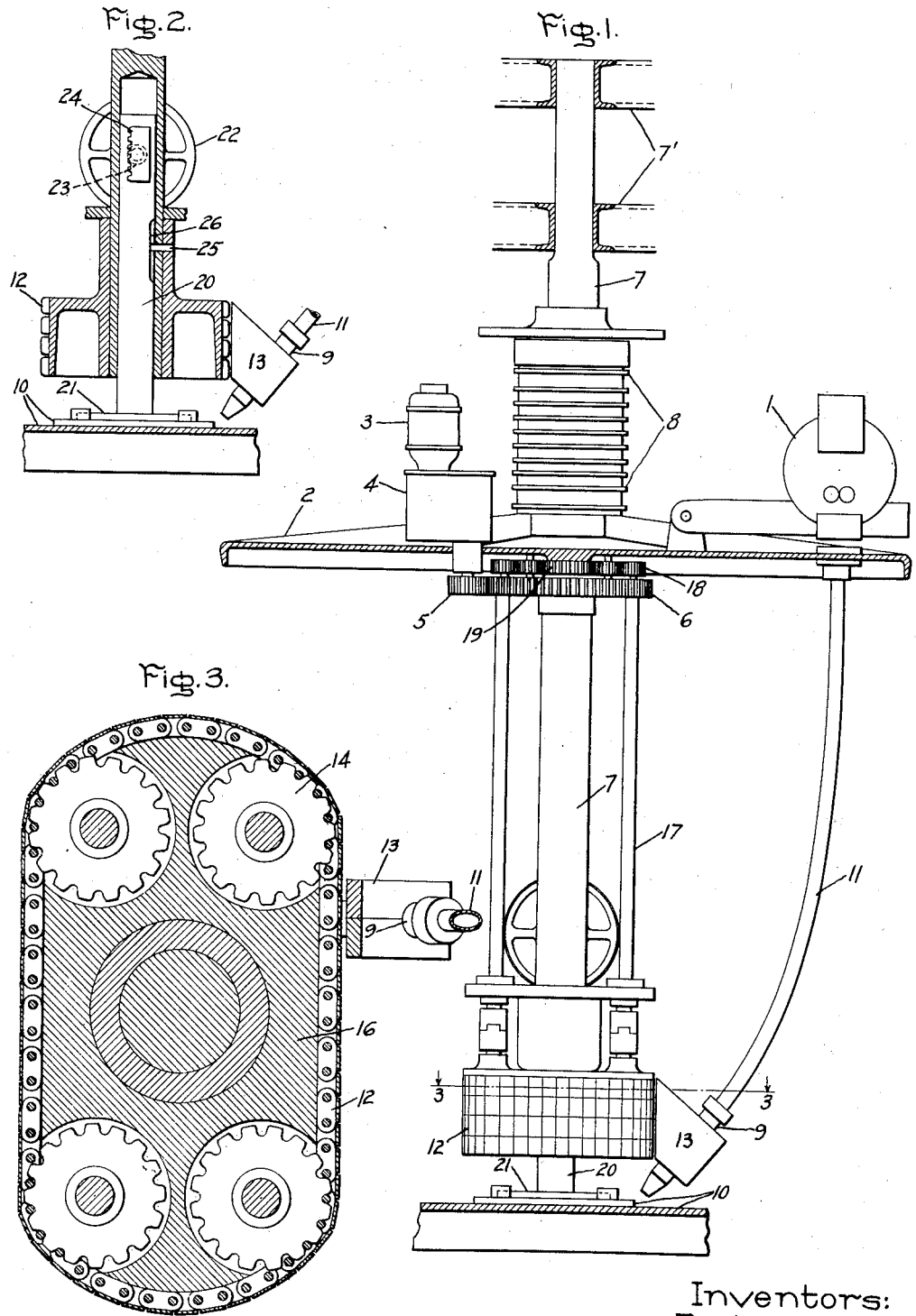
Inventors:
Paul Wagner,
Sally Sandelowsky,
by Charles E. Tullar
Their Attorney.

Patented June 9, 1931

1,809,653

UNITED STATES PATENT OFFICE

PAUL WAGNER, OF CHARLOTTENBURG, AND SALLY SANDELOWSKY, OF BERLIN-GRUNEWALD, GERMANY, ASSIGNORS TO GENERAL ELECTRIC COMPANY, A CORPORATION OF NEW YORK

AUTOMATIC ARC WELDING MACHINE

Application filed December 7, 1928, Serial No. 324,420, and in Germany January 14, 1928.

Our invention relates to welding apparatus and more particularly to an improved electric arc welding machine wherein means are provided for striking and maintaining a welding arc which is automatically traversed in a predetermined path above and about the surface of the work during the welding operation.

An object of our invention is to provide an improved device suitable for guiding an electrode along a particular path a great number of times as when engaged in production welding. The particular path traversed may be circular or non-circular, that is, of varying degree of curvature or sinuous, depending upon the adjustment of our machine.

A further object of our invention is to provide an automatic arc welding machine in which the electrode is guided at a constant rate of speed along a seam closed upon itself and in which twisting of the electrode is prevented by moving the device by which the electrode is guided in such a way that one revolution thereof along the seam corresponds exactly with one revolution of the welding head and its accessories.

Our invention will be better understood from the following description taken in connection with the accompanying drawings and its scope will be pointed out in the appended claims.

In the accompanying drawings Fig. 1 is a side view partly in section of a welding machine embodying our invention; Fig. 2 is a sectional view of the lower portion of the machine illustrating the construction of the work adjusting and clamping mechanism inserted in the lower portion thereof; and Fig. 3 is a sectional view along the line 3—3 of Fig. 1 illustrating the construction of the mechanism by means of which the electrode is directed along a predetermined path when performing the welding operation.

In Fig. 1 a welding head 1, by means of which an electrode is fed to and from the work in order to strike and maintain the welding arc during the welding operation, is mounted on a revoluble platform or table 2 which may also serve as a support for any auxiliary apparatus (not shown) associated with the welding head. Mounted also on table 2 is a motor 3 which is connected through reducing gears enclosed within a box 4 and gear 5 to a gear 6 attached to a column 7 upon which the table 2 is revolubly mounted. Current is supplied to the various devices located on the revoluble table 2 through slip rings 8 mounted on a drum encircling the support 7 which in turn is mounted on the table 2. The column 7 may be supported in any suitable manner as indicated at 7' in Fig. 1.

Welding electrode is fed through a flexible tube 11 from a supply not shown but which may be mounted on table 2 or column 7 by the welding head 1 to an electrode holder or nozzle 9 located adjacent the work 10. The nozzle 9 is mounted on a flexible band 12 by means of a clamp 13 attached thereto. In the machine illustrated the flexible band 12 is a chain, as more clearly shown in Fig. 3, which has been mounted on a pattern having a surface configuration corresponding to that of the seam to be welded. In the present instance the pattern is determined by four chain wheels 14 and a member 16, all of which are supported by the column 7 upon which the table 2 is supported. The chain wheels 14 are connected by shafts 17 with gears 18 that mesh with a gear 19 attached to the table 2 upon which the welding head is mounted. It will thus be seen that as the table 2 is revolved about the column 7 through the agency of the motor 3 acting upon the gears 6 affixed to the column, gears 18 will be revolved through the agency of gear 19 attached to the table and that these gears will through shaft 17 rotate the chain wheels 14 and cause the chain 12 to progress about the surface of the pattern formed by the chain wheels and the member 16 at a uniform rate of speed. The transmission is so chosen that with each revolution of the table 2 the flexible guide or chain 12 makes one complete passage about the pattern on which it is supported.

In the end of column 7, as best shown in Fig. 2, there is supported a plunger 20 terminating in a work clamping and work adjusting device 21 by means of which the work parts are firmly held in adjusted relationship beneath the guiding device by means of which the electrode nozzle 9 is traversed over the work. The plunger 20 and the work engaging member 21 may be raised or lowered by means of a handwheel 22 acting through a gear 23 and a rack 24 forming part of the plunger 20. The plunger 20 is secured against rotation in the end of the column 7 by means of a pin 25 which is attached to the column and which engages a groove 26 in the plunger 20.

The method of operation is as follows: The work is clamped in adjusted relationship beneath the guiding device by lowering the plunger 20 through the agency of handwheel 22 until the member 21 engages the work, positions it, and clamps it in place. The motor 3 and the feeding mechanism in the welding head 1 are then set in operation. While the welding head is feeding electrode to the arc, the motor 3 acting through gears 5 and 6 rotates the table 2 about the column 7. At the same time the table 2 through gears 18 and 19 transmits motion to the chain wheels 14 through whose agency the chain 12 is moved about the periphery of the pattern constituted by these chain wheels and the member 16. Relative movement between nozzle 9 attached to the guiding device and the welding head mounted on table 2 is taken care of by the flexible conduit 11. This conduit or the cable therein will not be twisted during the welding operation by reason of the fact that the table 2 and the chain 12 to which the nozzle is attached make a complete revolution in the same period of time.

It is, of course, apparent to those skilled in the art that by using a different arrangement of wheels 14 and a guide member 16 of different configuration a pattern of different design can be made over whose surface the flexible band to which the electrode nozzle is attached may be drawn to direct the electrode in a different circuit for welding a seam of different configuration from that welded by the apparatus illustrated in the drawings. While we have shown and described one particular embodiment of our invention such modifications and variations are contemplated as fall within the scope of our invention which is set forth in the appended claims.

What we claim as new and desire to secure by Letters Patent of the United States, is:

1. Welding apparatus comprising a flexible band, welding means mounted on said band, and means for moving said band above and about the surface of the work in a path of predetermined configuration.

2. Welding apparatus comprising a flexible band, an electrode holder mounted on said band, and means for moving said band above and about the surface of the work in a path of predetermined configuration.

3. Welding apparatus comprising an electrode holder, a pattern having a surface configuration corresponding to a seam in the work to be welded, a flexible band placed about said pattern, an electrode holder mounted on said band, and means for moving said band about said pattern.

4. Welding apparatus comprising welding means, a flexible band for supporting said welding means, means for moving said band about a pattern having a surface configuration corresponding to that of a seam in the work to be welded, means for supporting said pattern above the work, and means extensible from said supporting means and reacting thereon for clamping the work in adjusted relationship to said pattern.

5. An automatic arc welding machine comprising a revoluble platform, a welding head mounted on said platform, a guide device mounted between said platform and the work, an electrode nozzle mounted on said guide device, and means for rotating said platform and for moving said nozzle along said guide device.

6. An automatic arc welding machine comprising electrode feeding means, a pattern having a surface configuration corresponding to a seam to be welded, a flexible band placed about said pattern, an electrode nozzle mounted on said band, and means for moving said band and said electrode feeding means through one complete revolution in the same time.

7. An automatic arc welding machine comprising a revoluble platform, an automatic welding head mounted on said platform, a pattern having a surface configuration corresponding to a seam in the work to be welded placed between said platform and the work, a flexible band placed about said pattern, a welding nozzle mounted on said band, means for rotating said platform and means operated by said platform for moving said flexible band about said pattern.

8. An automatic arc welding machine for welding seams closed upon themselves, comprising a revoluble platform, a welding head and apparatus auxiliary thereto mounted on said platform, a guide device located between said platform and the work, an electrode nozzle mounted on said guide device, a flexible electrode conduit connecting said welding head with said electrode nozzle, means for moving said nozzle along said guide device, and means for revolving the platform once every time the welding nozzle completes a circuit of the guide device in welding a seam closed upon itself.

9. An automatic arc welding machine comprising a support, means for rotating a welding head with its auxiliary apparatus about said support, a guide device mounted on said support between said welding head and the work, an electrode nozzle mounted on said guide device for directing the welding electrode fed by said welding head along a seam in the work, and work clamping and work adjusting means located in the end of said support and extending beyond said guide device for clamping the work in adjusted relationship relative to said guide device.

In witness whereof, we have hereunto set our hands, this 17th day of November, 1928.

PAUL WAGNER.
SALLY SANDELOWSKY.